Patented July 25, 1939

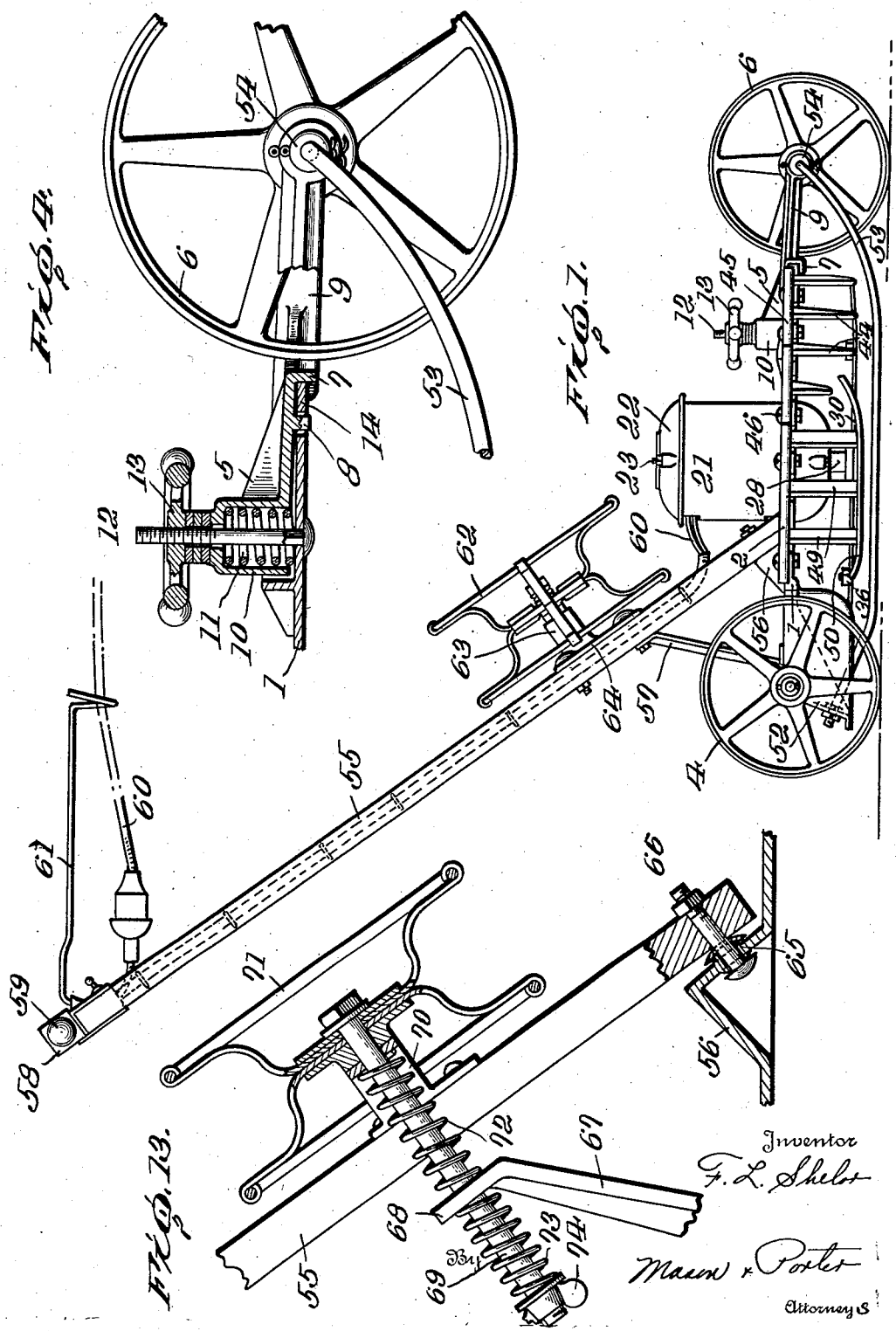

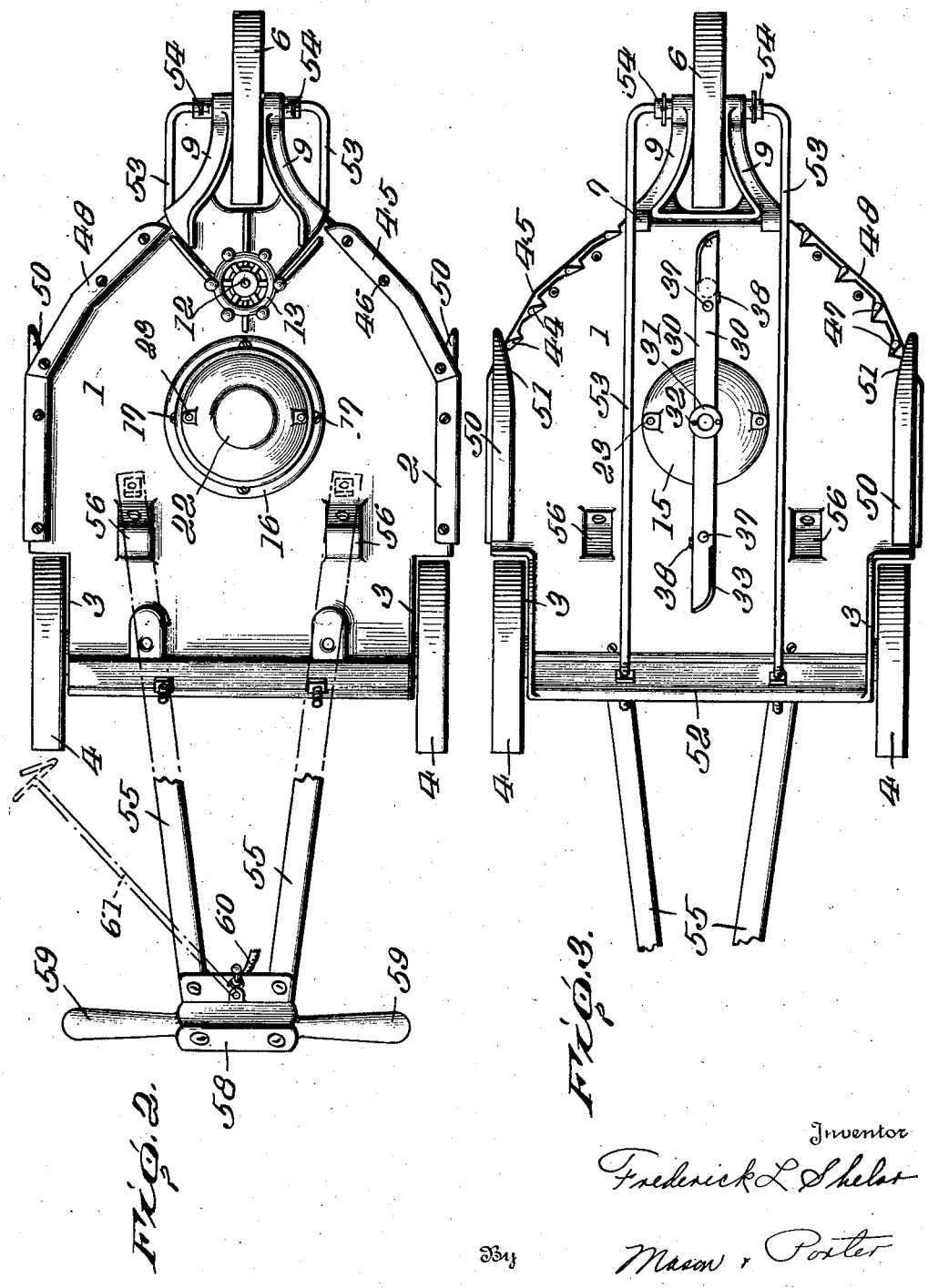

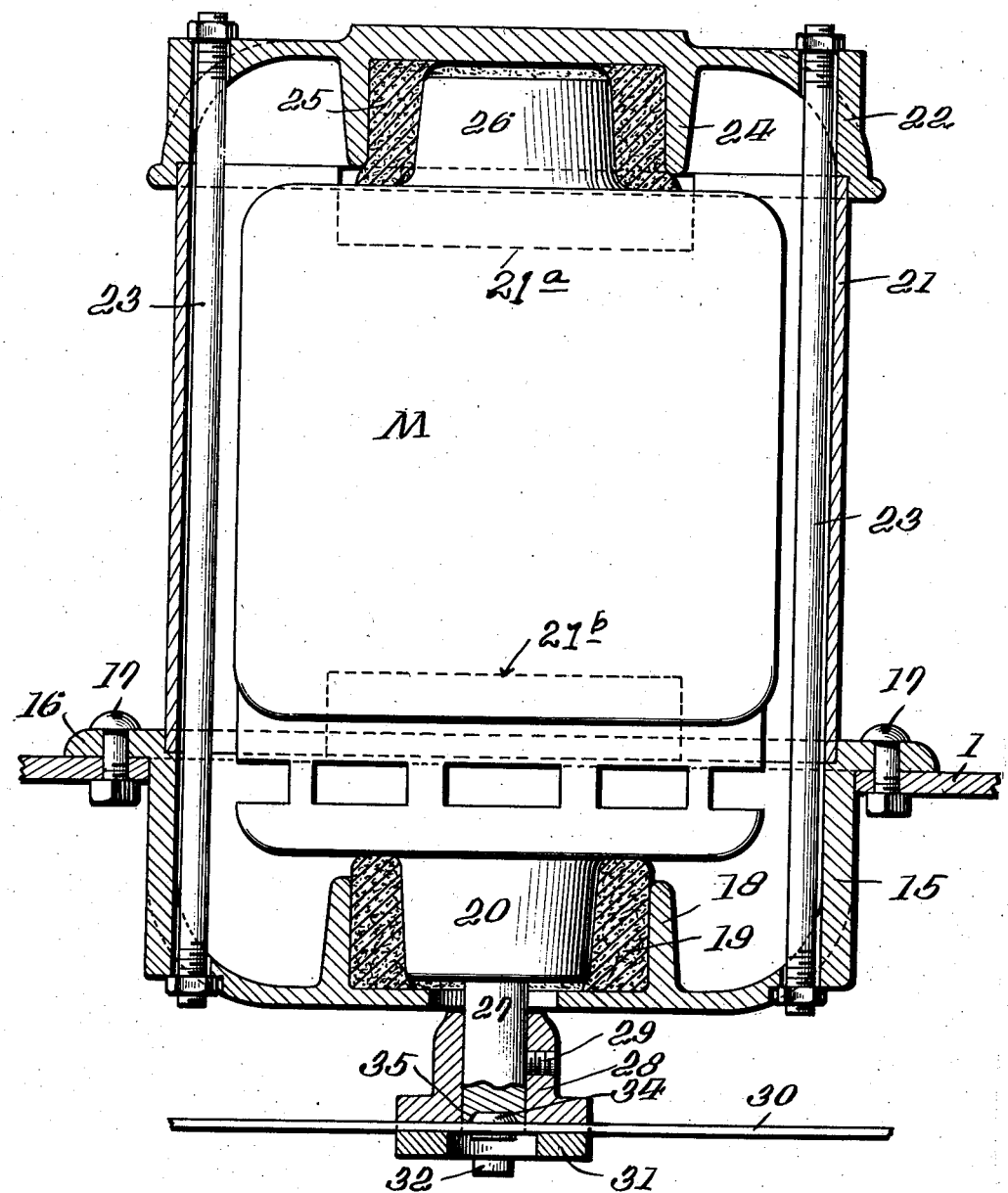

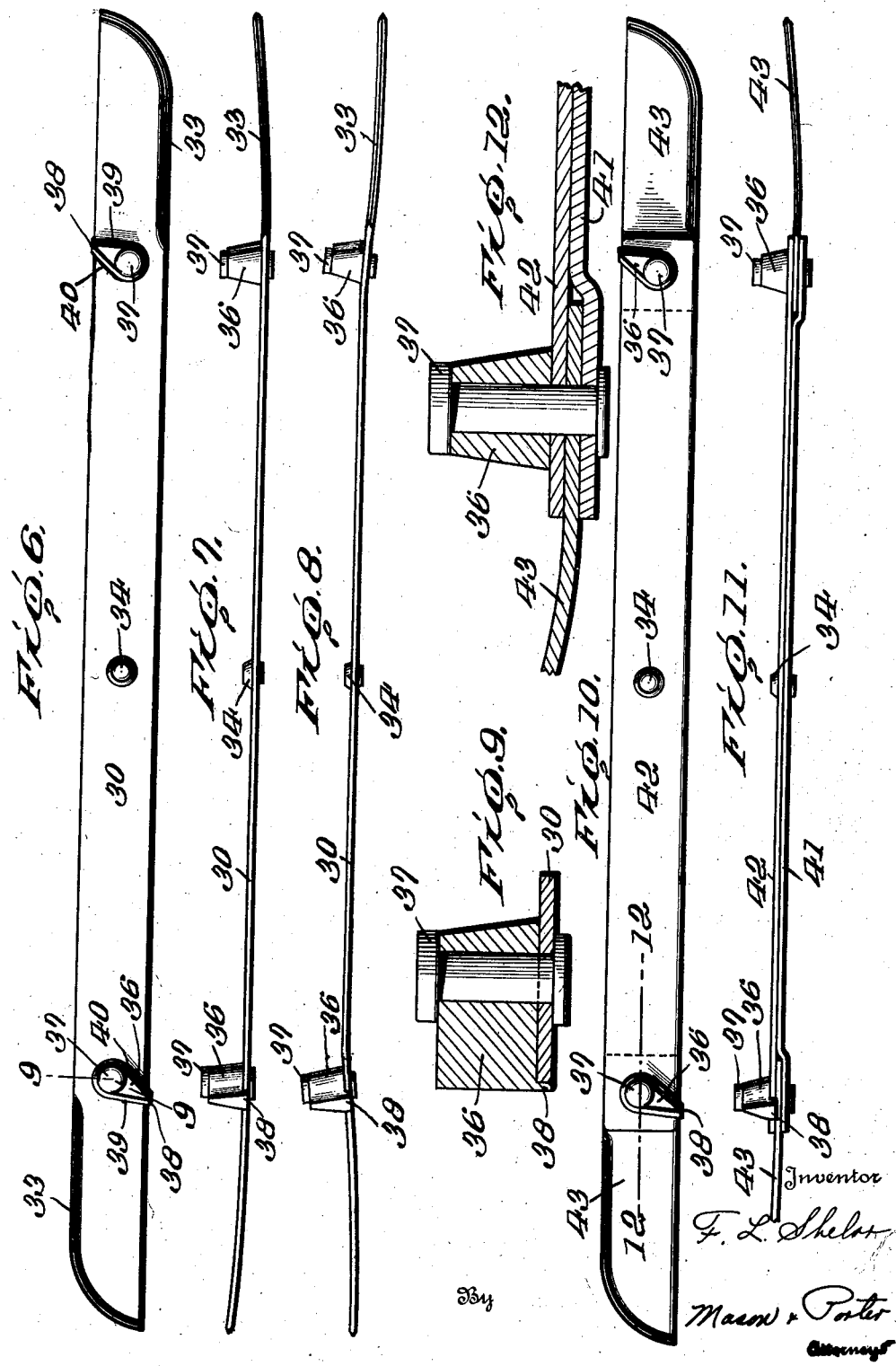

2,167,222

UNITED STATES PATENT OFFICE 2,167,222

LAWN MOWER

Frederick L. Shelor, Sandston, Va., assignor to The Richmond Foundry & Mfg. Co. Inc., Richmond, Va., a corporation of Virginia Application August 1, 1938, Serial No. 222,522

10 Claims. (Cl. 56—25)

The invention relates to new and useful improvements in lawn mowers and more particularly to a lawn mower having a power-driven cutting blade.

An object of the invention is to provide a lawn mower wherein the cutting blade is driven at very high speed so that the grass which is cut off by the rotating blade will be cut into small increments which fall to the ground in the grass and become a fertilizer for the grass.

A further object of the invention is to provide a lawn mower of the above type wherein the cutting blade is supported by the shaft of the driving motor.

Another object of the invention is to provide a lawn mower of the above type wherein the cutting blade is relatively long and narrow, with the edges at the end portions of the blade sharpened, and wherein said blade carries weights so disposed as to cause the outer end portions of the blade to flex downward during the rotation thereof for cutting the grass in a plane lower than the plane of rotation of the shank portion of the blade.

Another object of the invention is to provide a lawn mower of the above type wherein said weights are so disposed and shaped so as to create an air current moving radially outward from the center of rotation of the blade for carrying the cut grass out from beneath the mower.

Another object of the invention is to provide a lawn mower of the above type wherein the driving motor and the rotating blade are mounted on a supporting frame with the blade beneath the frame and wherein said frame is provided with depending guard fingers at the front and side portions thereof and a depending apron at the rear portion thereof.

A further object of the invention is to provide a lawn mower of the above type wherein the supporting frame is carried by wheels rotating about a common axis at the rear side of the frame, and the center wheel at the front of the frame rotating about an axis which is maintained parallel with the axis of the wheels at the rear of the frame.

A further object of the invention is to provide a lawn mower of the above type wherein the front wheel is adjustable for varying the position of the cutting blade relative to the ground.

A still further object of the invention is to provide a lawn mower of the above type wherein runners are disposed intermediate the sides of the frame and below the path of rotation of the cutter for preventing the cutter from striking the ground when the mower is moved over rough uneven surfaces.

These and other objects will in part be obvious and will in part be hereinafter more fully described.

In the drawings—

Figure 1 is a side view of a lawn mower embodying the improvements;

Fig. 2 is a view in plan of the same with parts broken away;

Fig. 3 is a bottom view of the lawn mower;

Fig. 4 is a view partly in section and partly in side elevation showing the mounting for the front wheel and also a portion of one of the runners;

Fig. 5 is a vertical sectional view through the casing which houses the motor and showing the means for attaching the casing to the main supporting frame of the lawn mower, and also the means for mounting the motor;

Fig. 6 is a plan view of the cutting blade;

Fig. 7 is an edge view of the blade showing the shape of the same when it is not rotating;

Fig. 8 is an edge view of the blade showing the position which it takes during the rapid rotation of the same;

Fig. 9 is a sectional view on the line 9—9 of Fig. 6;

Fig. 10 is a plan view showing a modified form of blade;

Fig. 11 is an edge view of the blade shown in Fig. 10;

Fig. 12 is a sectional view on the line 12—12 of Fig. 10;

Fig. 13 is a side view showing a modified form of means for supporting the handle.

The improved lawn mower includes a supporting frame which is preferably in the form of a flat horizontal plate made of metal. This frame is supported by two wheels rotating about a common axis at the rear of the frame and by one wheel located centrally of the frame and rotating about an axis parallel to the axis of the rear wheels. This front wheel is mounted on the frame so that it may be adjusted vertically relative thereto. Centrally of the frame is a motor which is preferably an electric motor mounted so that the driving shaft of the motor rotates about an axis perpendicular to the frame. The motor is mounted on cushion bearings in the casing which completely houses the motor, and this casing is rigidly attached to the frame. The shaft of the motor projects beneath the frame and the cutting blade is mounted thereon. The cutting blade is relatively long and narrow and the end portions of the cutting blade on the advanced side thereof is sharpened. The motor is driven at a very high speed so that the cutting blade will cut the grass not only once, but will cut the portions which are severed into small increments, practically fine dust, which settles into the cut grass, lodging on the ground where the particles become an excellent fertilizer for the grass. The cutting blade near each end thereof is provided with a weight located on the upper side of the blade. The ends of the blade are normally curved upward slightly, and when the blade is rotated at high speed, the end portions will flex downward bringing the cutting portions thereof into a cutting position which is lower than the plane of rotation of the shank of the blade. This enables the blade to be mounted well up from the ground and at the same time it will cut the grass at some little distance below its normal position of rest relative to the frame. These weights are shaped so as to function as the blades of a fan for causing a circulation of air radially outward from the center of rotation of the blade. This facilitates the stripping of the grass from the blades. These weights are also shaped so as to prevent any vacuum pockets being formed which would cause the finely cut grass to lodge therein.

There are depending guard fingers along the sides and partly across the front of the frame and a depending skirt at the rear of the frame. Selected fingers at the sides support plates at their lower ends which function not only as runners in case the ground is very rough, so as to support the frame intermediate the front and rear wheels in passing over the same, but also as a means for directing the grass to be cut inwardly into range of the rotating cutter blade. There are two additional runners extending beneath the path of rotation of the blade and disposed at opposite sides of the center of rotation of the blade. These runners are in the form of rods which yield and are rigidly attached to the apron at the rear and to the supporting bracket for the front wheel so that they are adjustable with the adjustment of the front wheel.

It is believed that the invention will be better understood by a detail description of the illustrated embodiment thereof. The lawn mower includes a main supporting frame 1, which as noted above, is of metal and in the form of a plate having parallel side edge portions 2, 2. These edge portions are cut away at 3, 3 to provide a space for the rear supporting wheels 4, 4 which are independently mounted on ball bearings for rotation, although they rotate about the same common axis. The recesses are formed in the frame so that the wheels are inset to an extent that the outer faces of the wheels are substantially flush with the outer edge portion of the frame section in advance thereof. At the front end of the frame there is a bracket 5 which carries the front wheel 6. This bracket 5 overlies the front end of the frame, as clearly shown in Fig. 4. It is provided with a depending portion 7 extending down over the front edge of the frame and a depending portion 8 extending down through an opening in the frame. The bracket has two forwardly projecting spaced arms 9, 9 carrying ball bearings for the shaft of the wheel 6. The bracket is provided with a housing 10 for a spring 11. A bolt 12 extends up through the frame and through this housing, and a nut 13 is threaded on to the upper end of this bolt. The spring normally tends to raise the rear end of the bracket, the same turning about the section 14 of the frame as a pivot, and this would lower the forward ends of the arms 9 and thus adjust the position of the wheel relative to the frame. The nut 13 limits the upward movement of the bracket, that is, the distance to which the bracket is separated from the frame by this spring. This makes a very easily adjustable bracket support for the wheel which permits the wheel to be shifted in substantially a vertical direction relative to the supporting frame, and thus the frame placed a greater or less distance from the ground on which the wheels are placed.

Mounted on the supporting frame 1 is a motor casing which includes a lower end member 15 having a flange 16. The end member extends through an opening in the main frame 1 and the flange overlies the main frame and is secured thereto by suitable bolts 17. This end member 15 has an upwardly projecting sleeve 18 which is adapted to receive an annular elastic cushioning member 19. The motor is indicated at M in Fig. 5, and the end hub of the motor casing 20 is forced into this cushioning member so that the motor is supported at its lower end by this cushioning member in the end member 15. Surrounding the motor and spaced therefrom is a cylindrical casing 21. At the upper end of this cylindrical casing is an upper end member 22. The upper end member is secured to the lower end member by clamping bolts 23. The end members are provided with recesses which receive the cylindrical casing 21, and this together with the casing, forms a rigid housing for the motor. This upper end member has a depending sleeve 21 in which is placed an elastic cushioning member 25 adapted to receive the hub 26 at the upper end of the motor frame. This forms a very rigid supporting housing for the motor in which the motor is mounted on cushion supports. The motor shaft 27 extends down through the opening in the lower end member 15 and carries a sleeve 28. This sleeve is attached to the motor shaft by means of a set screw 29. The sleeve has a recess in its lower face adapted to receive the cutting blade 30, and the cutting blade is attached to this sleeve by a clamping collar 31 which is secured to the sleeve by bolts 32, 32.

The cutting blade is shown in detail in Figures 6 to 9, inclusive. It is made of steel and is relatively long and narrow. The blade is also relatively thin so that it will flex when rotated at high speed, as hereinafter described. The advanced edge at each end of the blade is shaped so as to provide a cutting edge 33. This cutting edge extends around on to the end of the blade, and the end portion of the cutting edge is curved, as clearly shown in Figure 6 of the drawings. There is a rivet 34 which extends centrally through the blade and this rivet extends into a recess 35 in the end of the motor shaft 27. The purpose of this rivet is to center the blade longitudinally relative to the axis and direction of rotation, while the recess in the sleeve 28, together with the clamping collar 31 provides a positive means for rotating the blade. It will readily be seen that by adjusting the position of the sleeve, the cutter blade can be raised and lowered to a certain extent relative to the frame.

Mounted adjacent each end of the cutting blade is a weight 36. This weight is secured to the cutting blade by a rivet 37. The weight has a depending lip portion 38 which engages the edge of the cutting blade so as to prevent the weight from shifting about the center of the rivet. The outer face 39 of each weight is shaped at an angle of approximately five degrees to a line which is tangent to the path of rotation of the outer end of the weight. The blade rotates in the direction of the arrow indicated in Fig. 6, so that this inclined surface will operate as a fan blade and set up a circulation of air radially outward from the axis of rotation of the cutting blade. The opposite side 40 of the weight is shaped so as to avoid any pocket which might become a vacuum pocket that would load up with the finely cut particles of grass.

The portion of the blade extending outward from the weights 36, 36 is normally curved upward slightly, as shown in Fig. 7. When the blade is rotating at high speed, the centrifugal force acting on these weights will put the portion of the blade between the weights on a tension and stiffen the same. It will also cause the ends of the blades beyond the weights to bend or flex downwardly, as shown in Fig. 8. This downward bending of the ends will bring the cutting end portions well below the plane of rotation of the portion of the blade between the weights. This enables the blade to be positioned well up from the ground when stationary to facilitate the movement of the lawn mower over rough portions of the ground; and when the cutting blade is in action, it will move down so as to cut the grass in a lower plane, as stated.

In Figures 10 to 12, inclusive, there is shown a modified form of cutting blade wherein the central portions of the blade are formed from two strips of relatively soft iron indicated at 41 and 42. The cutting portion of the blade indicated at 43 is made of steel. These cutting portions are rigidly clamped between the soft iron portions 41 and 42 by the rivet 37 which secures the weight 36 to the blade. These cutting blades are curved upward slightly, and the soft metal portions of the blades 41 and 42 will flex downward in the same manner as described in connection with the blade as shown in Figures 6 to 9, inclusive.

Attached to the main frame are depending guard fingers 44, 44. These guard fingers are secured to a bar 45 which is clamped to the frame by means of bolts 46. There are similar guard fingers 47 at the other side of the frame which are carried by a bar 48 similarly clamped to the frame. It is noted that these guard fingers are tapered in cross section so as to provide a narrow edge at the side thereof approached by the rotating blade. This is for the purpose of preventing an excess accumulation of the small cut portions of grass on these fingers. Along the sides of the frame are depending guard members 49 which support a combined runner and deflector 50. There are depending guard members 49 and deflectors 50 at each side of the frame. As they are similar in construction a description of one will answer for the other. This deflector 50 has the inner face thereof tapered as indicated at 51 so that the grass to be cut will be deflected inward into the path of the cutter. This enables the lawn mower to be moved very close to a wall, bushes or other shrubbery so that the grass will be cut very close thereto. The purpose of insetting the wheels so that they are practically parallel with the outer face of these deflectors and the sides of the frame is to enable the grass to be cut very close to a wall or shrubbery, as noted. The purpose of these guard fingers at the front and along the sides is to prevent the operator of the lawn mower inserting his foot beneath the frame when the blade is in operation. They are, however, shaped and dimensioned so as not to interfere in any way with the cutting of the grass.

At the rear of the frame is a depending apron 52 which is a solid piece of metal. This depending apron guards against the possibility of anything being thrown rearward from beneath the machine and from anything detrimental to operator or operation entering from the rear.

Located beneath the frame are two rods 53, 53 which are relatively small and flexible. They extend through the apron and are rigidly secured thereto by nuts threaded on to the ends of the rods. The forward ends of the rods are bent laterally and attached to the hubs 54, 54 on the bracket 9 carrying the front wheel 6. These runners, as shown in Fig. 1, are disposed between the path of rotation of the blade and the ground. The purpose of the runners is two-fold: (a) to maintain the relation of ground and plane in which the blade rotates regardless of ground contour and (b) to support the plate (whether at rest or moving) where ground contour prevents any wheel from having contact with the ground. If the front wheel moves over a depression, then these runners will contact with the ground and support the frame so as to prevent the cutter from digging into the ground. These rods being flexible permit the front wheel to be adjusted relative to the supporting frame, and whenever the wheel is adjusted, the runners will be similarly adjusted so that they remain a substantial fixed distance above what might be called the plane on which the wheels of the lawn mower rest.

A handle is attached to the main frame for pushing the lawn mower and directing its course of movement over the lawn. As shown in Fig. 1, this handle device consists of two spaced members 55, 55 each of which is rigidly bolted to a bracket 56, 56 attached to the supporting frame 1. Each handle bar 55 is also bolted to a second bracket 57 which in turn is bolted to the main frame 1. This provides a very rigid support for the handle bars 55, 55. These handle bars are connected to a head 58 at their upper ends carrying hand grips 59, 59. The motor as illustrated is an electric motor. Current is supplied to the motor through a cable indicated at 60. This cable extends out through an opening in the upper portion of the casing 21 and is attached to one of the handle members adjacent the head 58. A swinging bracket arm 61 is provided for the cable and this bracket arm may be readily turned from one side to the other of the handle members and greatly aids in holding of the cable up off the ground so that the lawn mower may swing beneath the cable in turning around. The cable is of considerable length so as to give a wide range of movement for the lawn mower, and when not in use, the cable may be wound on to a reel 62 rotatably mounted on a bracket 63 attached to a cross bar 64 mounted on the handle members 55.

In Fig. 13 there is shown a modified mounting for the handle members which permits said handle members to be adjusted and also serves to take the shock when pushing the lawn mower over rough ground. In this figure, the handle members are indicated at 55 and they are connected at the upper end to a cross head carrying hand grips 59. Each handle member 55 at the lower end thereof is mounted on a cylindrical rib 65 and is clamped against this cylindrical rib by a bolt 66 which permits of a certain freedom of movement of the lower ends so that the handle members may be shifted from one angular position to another relative to the main supporting frame. Rigidly attached to the supporting frame 1 is a bracket 67. This bracket 67 has an outturned portion 68 provided with a relatively large opening therethrough. A bolt 69 passes through this opening and through a cross bar 70 on which the cable reel 71 is mounted. There is a spring 73 located beneath the bracket on the bolt 69 and a wing nut 74 serves as an abutment for the lower end of this spring 73. Thus it will be seen that by adjusting the nut 74, the position of the handle members 55 may be shifted to a different angular setting relative to the main frame, and this in effect, raises and lowers the hand grips relative to the ground. As noted above, these springs also take the shock incident to the movement of the lawn mower over rough ground.

It will be noted that the casing 21 surrounding the motor has an opening 21a near the upper end thereof and also an opening 21b near the lower end thereof. This is for the purpose of ventilating; air is drawn in through one opening and expelled through the other by the rotation of the motor shaft.

The operation of the lawn mower is thought to be obvious from the detail description which has been given. The mounting of the motor and the rigid attachment of the blade to the motor shaft enables the motor to be driven at very high speed, preferably at a speed of about 10,000 revolutions per minute. At a suitable high speed, the cutter not only severs the blades of grass, but also cuts the portions which are severed into very small increments, practically reducing the same into a form of chaff, and this chaff will settle onto the ground around the blades of grass and will become an excellent fertilizer for the lawn. It is not necessary to take up the grass during cutting, or rake after cutting. The rapidly rotating cutting blade with the weights attached thereto will cut at a relatively low level, and will cause the cut portions of grass to be forced out from beneath the cutter. The operator is well protected in case the blade should strike a stone and be broken. The blade, however, is made of steel, and may be bent, but will not easily rupture if it strikes an obstruction.

The positioning of the wheels enables the lawn mower to cut the grass close to a wall or close to shrubbery. Furthermore, by mounting the front wheel so that it rotates about an axis which is always maintained parallel to the axis of the rear wheels, makes it very easy to direct the movement of the lawn mower in a forward or backward direction, without any lateral strain or shifting force being required. The axis of the rear wheels is only a small distance in rear of the center weight, so that the operator by bearing down on the handles can relieve the pressure on the front wheel sufficient so as to direct the lawn mower in a curved path to one side or the other.

It is obvious that many changes may be made in the details of construction and the arrangement of the parts without departing from the spirit of the invention as set forth in the appended claims.

Having thus described the invention, what I claim as new and desire to secure by Letters-Patent, is—

1. A lawn mower comprising a supporting frame, a relatively long and narrow flexible cutting blade disposed beneath said frame, means located midway between the ends of said blade for supporting the same for rotation about an axis perpendicular to the frame, means carried by the frame for rotating the blade, and a weight mounted on the upper side of said blade adjacent each end thereof, said weights operating when said blade is rotated at high speed to flex the outer end portions of the blade downward.

2. A lawn mower comprising a supporting frame, a relatively long and narrow flexible cutting blade disposed beneath said frame, means located midway between the ends of said blade for supporting the same for rotation about an axis perpendicular to the frame, means carried by the frame for rotating the blade, and a weight mounted on the upper side of said blade adjacent each end thereof, said weights operating when said blade is rotated at high speed to flex the outer end portions of the blade downward, each weight having the outer face inclined inwardly away from a line tangent to the path of rotation of the forward end of the blade so as to cause a circulation of air radially outwardly from the center of rotation of the blade.

3. A lawn mower comprising a supporting frame, wheels disposed at the rear of said frame and rotating about a common axis, a bracket attached to the front of the frame centrally thereof, a front wheel carried by said bracket, said bracket having a pivotal support on said frame intermediate its ends and a housing at the rear end of the bracket, a spring located in the housing between the bracket and the frame and normally tending to force the front end of the bracket downward, a bolt extending through the frame and the bracket, and a nut adjustable on the bolt for varying the position of the bracket, a relatively long and narrow flexible cutting blade disposed beneath the frame and mounted for rotation about a vertical axis, and means carried by the frame for rotating the blade.

4. A lawn mower comprising a supporting frame, wheels at the rear of the frame mounted for rotation about a common axis, a center wheel at the front end of the frame, a bracket carried by the frame and supporting said front wheel, means whereby said bracket may be adjusted for raising and lowering the wheel relative to the frame, said frame having a depending apron at the rear end thereof, a motor mounted on said frame with its shaft arranged for rotation about an axis perpendicular to the frame and with the shaft extending beneath the frame, a cutting blade mounted on said shaft, runners attached to the apron and to the bracket carrying the front wheel and disposed beneath the path of rotation of the blade for preventing the blade from contacting with the ground when passing over rough surfaces.

5. A lawn mower comprising a supporting frame, wheels at the rear of the frame mounted for rotation about a common axis, a center wheel at the front of the frame, a bracket for supporting said center wheel whereby it may be raised and lowered relative to the frame, a motor mounted on said frame with its shaft arranged perpendicular to the frame and projecting beneath the frame, a relatively long and narrow flexible cutting blade rigidly attached to said motor shaft, said frame having depending guard fingers at the sides and in front thereof, and a depending apron at the rear thereof.

6. A lawn mower comprising a supporting frame, wheels at the rear of the frame mounted for rotation about a common axis, a center wheel at the front of the frame, a bracket for supporting said center wheel whereby it may be raised and lowered relative to the frame, a motor mounted on said frame with its shaft arranged perpendicular to the frame and projecting beneath the frame, a relatively long and narrow flexible cutting blade rigidly attached to said motor shaft, said frame having depending guard fingers at the sides and in front thereof and a depending apron at the rear thereof, said frame also having depending members at the opposite sides thereof supporting deflector plates for deflecting the grass into the path of rotation of the blade.

7. A lawn mower comprising a supporting frame having parallel sides cut away adjacent the rear end of the frame to receive rear supporting wheels, a bracket attached to the supporting frame on which said front wheel is mounted, a motor mounted on said frame with its shaft perpendicular to the frame and projecting beneath the same, a relatively long and narrow cutting blade mounted at the lower end of the motor shaft, said frame having depending guard fingers at the front and side portions shaped in cross section so as to present a relatively narrow edge to the approach of the cutting blade, said guard fingers at each of the parallel sides of the frame carrying at their lower ends a combined runner and deflector for deflecting the grass into the path of the cutter.

8. A lawn mower comprising a supporting frame, a wheel at each side of the rear of said frame, a wheel in front and at the center of the frame, a motor mounted on said frame with its shaft perpendicular thereto and projecting beneath the frame, a cutting blade mounted on the motor shaft, handle members rigidly connected to said frame, said handle members being connected at their lower ends to said frame so as to permit limited vertical movement, a bracket member carried by said frame, a cross bar carried by said handle members, a bolt extending through the handle members and through said bracket, a spring between the cross bar and the bracket, a nut adjustable on the lower end of said bolt, and a spring located between the bracket and said nut.

9. A lawn mower comprising a supporting frame, a relatively long and narrow flexible cutting blade disposed beneath said frame, means located midway between the ends of said blade for supporting the same for rotation about an axis perpendicular to the frame, means carried by the frame for rotating the blade, and a weight mounted on the upper side of said blade adjacent each end thereof, said weights operating when said blade is rotated at high speed to flex the outer end portions of the blade downward, each weight having the outer face inclined inwardly away from a line tangent to the path of rotation of the forward end of the blade so as to cause a circulation of air radially outwardly from the center of rotation of the blade, said weights on the opposite faces being shaped so as to avoid the formation of a vacuum pocket during the rotation of the blade.

10. A lawn mower comprising a supporting frame, a relatively long and narrow flexible cutting blade disposed beneath said frame, means located midway between the ends of said blade for supporting the same for rotation about an axis perpendicular to the frame, means carried by the frame for rotating the blade, and a weight mounted on the upper side of said blade adjacent each end thereof, said weights operating when said blade is rotated at high speed to flex the outer end portions of the blade downward, said end portions of the blades being normally curved upwardly so that when said blade is rotated and flexed, the end portions will move in a plane substantially parallel with the plane of the frame.

FREDERICK L. SHELOR.